United States Patent [19]
Visger et al.

[11] Patent Number: 6,111,025
[45] Date of Patent: *Aug. 29, 2000

[54] BLOCK COPOLYMER SURFACTANTS PREPARED BY STABILIZED FREE-RADICAL POLYMERIZATION

[75] Inventors: Daniel C. Visger, Mentor; Klaus-Werner Damm, Chagrin Falls; Richard M. Lange, Euclid; Barton J. Schober, Perry, all of Ohio

[73] Assignee: The Lubrizol Corporation, Wickliffe, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/881,893

[22] Filed: Jun. 24, 1997

[51] Int. Cl.$^7$ .......................... C08F 293/00; C08F 295/00
[52] U.S. Cl. .......................... 525/244; 525/259; 525/263; 525/267; 525/273; 525/293; 525/294; 525/296; 525/299
[58] Field of Search ..................... 525/244, 259, 525/263, 267, 273, 293, 294, 296, 299

[56] References Cited

U.S. PATENT DOCUMENTS

| | | | |
|---|---|---|---|
| 3,016,370 | 1/1962 | Breitenbach et al. | 260/88.1 |
| 3,189,663 | 6/1965 | Nozakie | 260/879 |
| 3,214,498 | 10/1965 | Bauer | 260/882 |
| 3,652,724 | 3/1972 | Shimomuar et al. | 260/877 |
| 4,026,962 | 5/1977 | Lambla et al. | 260/827 |
| 4,581,429 | 4/1986 | Solomon et al. | 526/220 |
| 4,777,230 | 10/1988 | Kamath | 526/86 |
| 4,915,755 | 4/1990 | Kim | 149/19.4 |
| 5,186,860 | 2/1993 | Joyce, Jr. et al. | 252/500 |
| 5,225,492 | 7/1993 | Kennedy et al. | 525/299 |
| 5,322,912 | 6/1994 | Georges et al. | 526/204 |
| 5,401,804 | 3/1995 | Georges et al. | 525/267 |
| 5,412,047 | 5/1995 | Georges et al. | 526/204 |
| 5,475,061 | 12/1995 | Machida et al. | 525/247 |
| 5,498,679 | 3/1996 | Moffat et al. | 526/204 |
| 5,530,079 | 6/1996 | Veregin et al. | 526/219.3 |
| 5,545,504 | 8/1996 | Keoshkerian et al. | 430/137 |
| 5,608,023 | 3/1997 | Odell et al. | 526/225 |
| 5,714,993 | 2/1998 | Kerian et al. | 347/95 |
| 5,721,320 | 2/1998 | Priddy | 525/316 |

OTHER PUBLICATIONS

Coca et al, Block Copolymerization bt Transformation of "Living" Carbocationic into "Living" Radical Polymerization. Polymer Preprints, , 38 (1), pp. 693–694, Apr. 1996.

*Primary Examiner*—Jeffrey C. Mullis
*Attorney, Agent, or Firm*—David M. Shold

[57] ABSTRACT

A block copolymer of a hydrophobic block of one or more hydrophobic monomers and a hydrophilic block of one or more hydrophilic monomers is prepared by polymerizing a hydrophobic monomer to prepare the hydrophobic block, using a free radical polymerization process using a stable free radical agent, preserving a stabilized active polymerization site on the hydrophobic block; adding a hydrophilic monomer to the stabilized active hydrophobic block; and further reacting the mixture to effect polymerization of the hydrophilic monomer. The polymerization of the hydrophilic monomer is conducted in an amidic solvent in which the hydrophobic block and the hydrophilic monomer are soluble.

26 Claims, No Drawings

BLOCK COPOLYMER SURFACTANTS PREPARED BY STABILIZED FREE-RADICAL POLYMERIZATION

BACKGROUND OF THE INVENTION

The present invention relates to copolymers of hydrophobic and hydrophilic blocks, and a method for their preparation.

U.S. Pat. No. 4,581,429, Solomon et al., Apr. 8, 1986, discloses a process for free radical polymerization to produce relatively short chain length homopolymers and copolymers, including block and graft copolymers. The initiator is a compound of the general formula

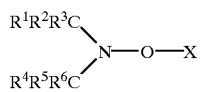

Polymers prepared include methyl acrylate/styrene diblock and styrene/methyl acrylate graft copolymers.

U.S. Pat. No. 5,530,079, Veregin et al., Jun. 25, 1996, discloses a polymerization process comprising heating a mixture of a free radical initiator, a stable free radical agent, at least one polymerizable monomer compound, and optionally a solvent. Among the suitable monomers are carboxylic acid or acrylic monomers, esters, amides, etc. Solvents may be selected from aliphatic alcohols, glycols, ethers, glycol ethers, pyrrolidines, . . . amides, carboxylic acids and salts thereof, etc.

U.S. Pat. No. 3,189,663, Nozakie, Jun. 15, 1965, discloses block copolymers prepared from polymers of certain unsaturated acids. One segment is made up of polymerized ethylenically unsaturated carboxylic acids, anhydrides, esters, or amides. A second segment is made up of dissimilar members of the aforementioned group, esters of unsaturated alcohols and saturated carboxylic acids, alkenes, alkadienes, vinyl halides, vinylidene halides, ethylenically unsaturated nitriles, alkenyl-substituted aromatic hydrocarbons, alkenyl-substituted halo-hydrocarbons, and alkenyl ethers. Polymers having solubility in both water and oil may be obtained by the disclosed process. A preformed polymer of e.g. ethylenically unsaturated carboxylic acids, anhydride thereof, their esters, and amides is mixed with any of the above-mentioned monomers, including, e.g., styrene. The reaction is generally accomplished in a liquid medium such as water, organic solvents or diluents, such as benzene, cyclohexane, xylene, hexane, diheptyl ether and the like.

U.S. Pat. No. 5,401,804, Georges et al., Mar. 28, 1995, discloses a free radical polymerization process, involving heating a mixture of a free radical initiator, a stable free radical agent, and at least one polymerizable monomer. The stable free radical agent can be 2,2,6,6-tetramethyl-1-piperidinyloxy. An organic sulfonic or organic carboxylic acid can be added to increase the rate of formation of the resin.

SUMMARY OF THE INVENTION

The present invention provides a process for preparing a block copolymer comprising a hydrophobic block (A) comprising one or more hydrophobic monomers and a hydrophilic block (B) comprising one or more hydrophilic monomers, salad process comprising:

(a) polymerizing at least one hydrophobic monomer to prepare a hydrophobic block, using a free radical polymerization process, wherein a stable free radical agent is employed during the polymerization, thereby preserving a stabilized active polymerization site on the hydrophobic block;

(b) adding at least one hydrophilic monomer to the stabilized active hydrophobic block of (a); and (c) further reacting the mixture of (b) to effect polymerization of said hydrophilic monomer, thereby preparing a hydrophilic block;

wherein the polymerization of the hydrophilic monomer is conducted in an amidic solvent in which the hydrophobic block and the at least one hydrophilic monomer are sufficiently soluble to permit polymerization.

The present invention also encompasses a polymer comprising a first block comprising one or more hydrophobic monomers; and a second block comprising a polymer of an acrylamidoalkane sulfonic acid or a salt thereof, including those polymers prepared by the above processes.

DETAILED DESCRIPTION OF THE INVENTION

The polymers of the present invention are block copolymers having a hydrophobic portion and a hydrophilic portion. Block copolymers are well known to those skilled in the art. They are polymer comprised of two or more polymeric chains or blocks, each containing different monomers. In the polymers of the present invention, the first block is a hydrophobic block comprising one or more hydrophobic monomers, an the second, a hydrophilic block. The terms "hydrophobic" and "hydrophilic," when applied to the monomers or polymers of this invention, are used in their ordinary sense. That is, hydrophilic, when it refers to a polymer, means that the polymer has a strong tendency to bond with or absorb water, which can result in solution of the polymer or swelling and formation of a reversible gel. This property is characteristic of polymers prepared from polar or ionic monomers. Similarly, hydrophobic, when it refers to a polymer, means that the polymer is antagonistic to water and generally cannot be dissolved in or swelled by water. This property is characteristic of polymers prepared from relatively non-polar monomers.

While the terms "hydrophobic" and "hydrophilic" may not necessarily be capable of unequivocal quantitative definition, they are generally well understood by those skilled in the art. Hydrophilic monomers are those which interact favorably with water, often characterized by a measure of solubility in water or similarly polar solvents. Hydrophobic monomers exhibit little or no favorable interaction with water and are generally not appreciably soluble in water or similarly polar solvents. The hydrophobic or hydrophilic character of a monomer can also be understood to approximately correlate with results derived from the octanol/water partition test. The original form of this test, involving measurement of the equilibrium concentration of a dissolved substance in a two-phase system of n-octanol and water, as well as a chromatographic method, are described in ASTM E-1147-92. $P = C_{octanol}/C_{water}$. The hydrophilic or hydrophobic nature of a monomer can be evaluated by comparing its P value with the P values of those monomers categorized hereinbelow as hydrophilic or hydrophobic. For many hydrophilic chemicals, log P is about 0.8 or less, commonly 0.7 or less. That of acrylic acid, for instance, is about 0.4. For many hydrophobic chemicals, log P is greater than 0.8, more commonly 0.9 or greater. That of ethylbenzene (expected to be similar to styrene) is about 3.1.

A listing of log P values of many chemicals as well as a theoretical discussion of partition coefficients can be found in Leo et al., *Chemical Reviews*, 71, 6, pp. 528–616 (1971).

The first, hydrophobic block of the present invention is a block derived from the polymerization at least one hydrophobic monomer. Typical hydrophobic monomers include polymerizable aromatic monomers, and preferably (for ease of polymerization) vinyl aromatic monomers. Vinyl aromatic monomers are those in which an aromatic group includes one or more vinyl groups as substituents, which, in its narrowest sense refers specifically to a CH2=CH-group, although homologues in which one or more of the hydrogen atoms is replaced by another group such as a lower alkyl group are intended to by included in the general term "vinyl."

The type of aromatic group in the aromatic monomer is not particularly limited. Specific nonlimiting examples of hydrophobic single ring aromatic moieties are the following:

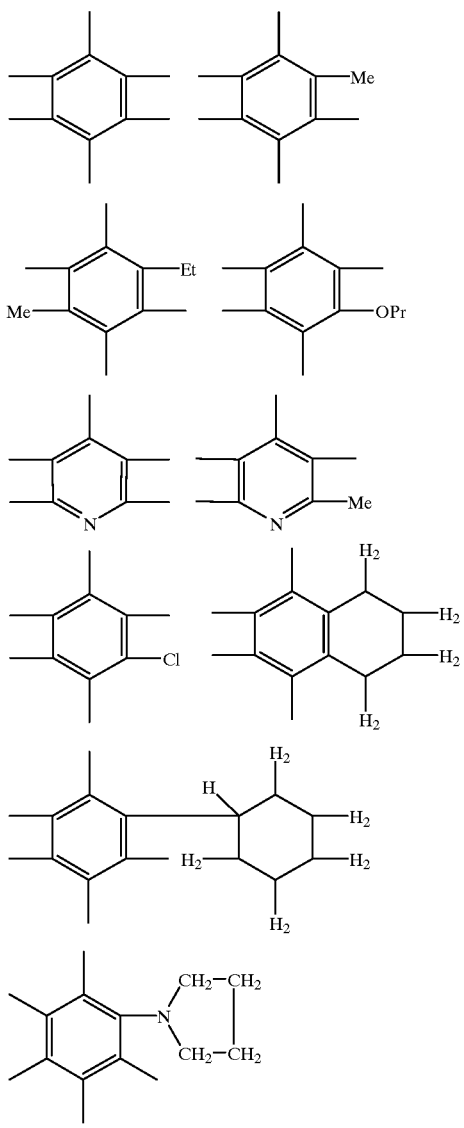

wherein Me is methyl, Et is ethyl or ethylene, as appropriate, and Pr is n-propyl.

Specific nonlimiting examples of hydrophobic fused ring aromatic moieties are:

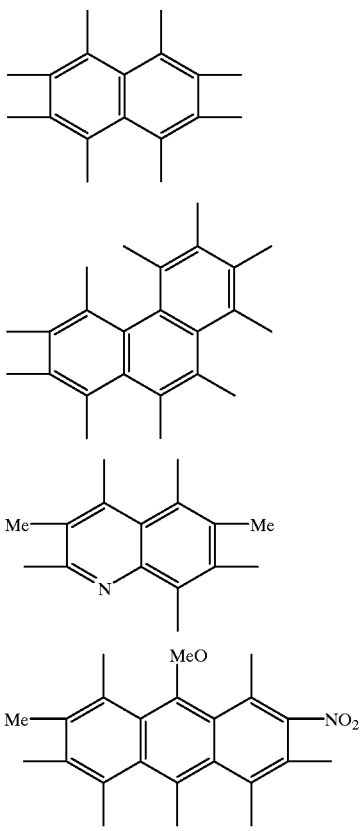

Polyaromatic moieties include not only fused aromatic species, but also aromatic rings linked by a direct carbon-carbon bond or by one or more linking groups of sufficiently non-polar character to retain the hydrophobic nature of the material, such as a hydrocarbylene or alkylene group. Preferred vinyl aromatic monomers include styrene and substituted styrene.

Other hydrophobic monomers include polymerizable olefin monomers, including those of 2 to 16 carbon atoms. The olefins can be monoolefins such as ethylene, propylene, 1-butene, isobutene, and 1-octene, or polyolefinic monomers, preferably diolefinic monomers such 1,3-butadiene or isoprene. Also included are relatively nonpolar esters such as alkyl acrylates or alkyl methacrylates, for instance, methyl acrylate, ethyl acrylate, 2-ethylhexyl acrylate, methyl methacrylate, and ethyl methacrylate. Also included are dialkyl fumarates and dialkyl maleates and their corresponding half esters (provided that group derived from the alcohol moiety is sufficiently long to provide hydrophobic character, e.g., greater than 8 carbon atoms), maleamic esters, maleimides, vinyl esters of $C_1$ to $C_{12}$ carboxylic acids, and allyl carboxylates.

The hydrophobic block can also comprise a mixture of hydrophobic monomers, such as, in one preferred embodiment, a mixture of styrene and an alkyl acrylate or an alkyl methacrylate. Other embodiments include mixtures of styrene and alkyl-substituted acrylamides or alkyl-substituted methacrylamides.

The hydrophobic block can also comprise a single hydrophobic monomer or a mixture of hydrophobic monomers, as described above, along with a minor amount of hydrophilic monomer units, described in greater detail below. The amount of any such hydrophilic monomer units should be sufficiently small that the first block retains its essential hydrophobic character. The specific amount of hydrophilic monomer which can be accepted will, of course, depend on the specific monomer in question; smaller amounts of highly hydrophilic monomers would normally be acceptable, while larger amounts of less highly hydrophilic monomers could be used, while retaining the essential hydrophobic nature of the block. Preferably the amount of hydrophilic monomers in the first block should be less than 10 percent by weight, more preferably less than 5 percent by weight.

The molecular weight (weight average) of the hydrophobic block is normally 1000 to 200,000, preferably 5000 to 100,000, and more preferably 10,000 to 50,000.

The second block of the polymer is a hydrophilic block, comprising one or more hydrophilic monomers. Suitable hydrophilic monomers include acids (including salts or anhydrides of acids), unsubstituted amides, N-hydrocarbyl-substituted amides including N-vinyl amides, sulfoalkyl esters, or sulfoalkyl amides. Such monomers, for ease of polymerization, would normally include an ethylenically unsaturated group such as a vinyl group.

Typical acids include carboxylic acids such as acrylic acid, methacrylic acid, maleic acid, fumaric acid, itaconic acid, acidic half esters of maleic and fumaric acids where the alcohol-derived moiety contains 1 to 8 carbon atoms, and maleamic acids. Preferred acids contain 3 to 10 carbon atoms, preferably 3 to 5 carbon atoms. Also included are salts or anhydrides of such acids.

Salts include ammonium salts, amine salts, and metal salts such as, in particular, alkali metal salts and alkaline earth metal salts. Specific preferred metals include lithium, sodium, and potassium salts. In some cases it may be convenient to initially prepare the polymer containing the hydrophilic monomer it its acid or anhydride form, and thereafter to neutralize the acid functionality of the polymer. The salts may be substantially completely neutralized, that is, about 100% of the acid groups being in the salt form, or incompletely neutralized. Fully neutralized and partially neutralized salts are prepared by known methods of reacting an acid with a base supplying the desired cation.

Alternatively, the hydrophilic monomer can be a sulfonic acid or a salt thereof. Suitable polymerizable sulfonic acids include acrylamidoalkane sulfonic acids such as 2-acrylamido-2-methylpropanesulfonic acid, as well as such monomers as 2-sulfoethyl methacrylate, styrenesulfonic acid, vinylsulfonic acid, allylsulfonic acid, and methallyl-sulfonic acid. The hydrophilic monomer can also be a sulfoalkyl ester such as 2-sulfoethylmethacrylate, 3-sulfopropyl acrylate, or 3-sulfopropylmethacrylate.

The hydrophilic monomer can also be a phosphonic acid or a salt or anhydride thereof, such as phosphonomethylacrylate, phosphonomethyl methacrylate, vinyl phosphonic acid, and allyl phosphonic acid.

The hydrophilic monomer can also be an amide, either unsubstituted such as acrylamide, or methacrylamide, or a N-substituted derivative thereof such as an N-hydrocarbyl-substituted amide derivative. It will be recognized that as the number and length of such hydrocarbyl substituents increases, the hydrophilic nature of the monomer and the resulting polymer block will decrease. Accordingly, each such hydrocarbyl group will preferably contain 1 to 6 carbon atoms, more preferably 1 to 4 carbon atoms, and still more preferably 1 or 2 carbon atoms. Preferably, also, each nitrogen atom of the amide will contain only one such substituent. Among the suitable amides are N-methylacrylamide, N,N-dimethyl acrylamide, N-methylmethacrylamide, N,N-dimethylmethacrylamide, as well as such materials as t-butylacrylamide. Other substituted amides include those having N-substituents with polar functional groups such as hydroxy or carbonyl groups, such as $CH_2=CHC(O)NH—CH_2CH(OH)CH_3$ or $CH_2=CHC(O)NH—C(CH_3)_2CH_2C(O)CH_3$ or $CH_2=CHC(O)NH—CH_2CO_2H$.

Sulfoalkyl amides include sulfomethyl acrylamide and related materials.

As in the case of the hydrophobic block, the hydrophilic block can likewise be prepared from a mixture of monomers. Thus, if one of the less strongly hydrophilic monomers is used, it may advantageously be used in combination with one of the more strongly hydrophilic monomers. Moreover, a minor amount of hydrophobic monomers can be employed in the hydrophilic block, provided that a sufficient amount of hydrophilic monomer is also present to cause the block, as a whole, to be hydrophilic. Preferably the amount of hydrophobic monomers in the second block should be less than 10 percent by weight, more preferably less than 5 percent by weight. Typical mixtures of monomers in the hydrophilic block include an acrylamidoalklanesulfonic acid with various acrylamides such as acrylamide, N,N-dimethylacrylamide, or N-t-butylacrylamide. Preferably the acrylamidoalkanesulfonic acid monomer and the acrylamide monomer (if such is used) are present in a mole ratio of 5:1 or 2:1 to 1:5. In a preferred embodiment, the hydrophilic block is a copolymer containing 2-acrylamido-2-methylpropanesulfonic acid (or a salt thereof), or a homopolymer of 2-acrylamido-2-methylpropanesulfonic acid (or a salt thereof).

It is also possible that a hydrophobic monomer may be employed which, after incorporation into the polymer, can be converted into a hydrophilic monomer. For instance, certain esters, such as vinyl acetate, are normally be considered hydrophobic and would be incorporated into a polymer using techniques for polymerizing hydrophobic monomers. After polymerization, the polymer can be subjected to hydrolysis to convert the monomer units into hydrophilic vinyl alcohol units.

The molecular weight (weight average) of the hydrophilic block is normally 1,000 to 60,000, preferably 3,000 to 30,000, and more preferably 5,000 to 20,000. The molecular weight of the entire polymer, comprising both the hydrophobic and the hydrophilic blocks, will preferably be 15,000 to 200,000.

The ratio of the weight of monomers charged to prepare the hydrophobic block to the weight of monomers charged to prepare the hydrophilic block will preferably be 10:1 to 1:20, and more preferably 3:1 to 1:10.

The number of blocks in each polymer of the present invention will normally be two: the first hydrophobic block and the second hydrophilic block. Such materials can be referred to as A-B block copolymers. However, polymers with a larger number of blocks can also be prepared, which could be designated A-B-A, B-A-B, A-B-A-B, and so on.

Conditions for preparation of a variety of block copolymers are known. For instance, polymerization of acrylate and methacrylate esters onto polystyrene polymers are described in the Encyclopedia of Polymer Science and Engineering (1987 ed.) Vol. 2. Several techniques are employed in making vinyl aromatic block polymers, some of which involve the intermediacy of a "living" polystyrene segment having an anionic moiety at one or both ends of the molecule. The living anionic sites can then be used to graft the next type of block by addition or displacement reaction on the second type of monomer chosen. For example, conjugate addition of a carbanion end to an acrylate ester can result in a new carbanion adjacent to a stabilizing carbonyl group. Subsequent consecutive additions to acrylate ester monomer results in the growth of a polyacrylate block attached to the original polystyrene segment. If the starting polystyrene segment has a living anion moiety at both ends, conjugate addition can result in a triblock polymer wherein the end segments are polyacrylate blocks. Anionic techniques, however, are generally unsuitable for preparation of polymers of the present invention, because the presence of hydrophilic monomers, many of which are acidic, will often interfere with the active anionic site.

The preferred process for the preparation of the present block copolymers, however, involves free radical, rather than ionic, polymerization. The present process includes, first, polymerizing at least one hydrophobic monomer, as defined above to prepare a hydrophobic block, using a free radical polymerization process. A stable free radical agent is employed during the polymerization, thereby preserving a stabilized active polymerization site on the hydrophobic block thus prepared. Thereafter at least one hydrophilic monomer is added to the stabilized active hydrophobic block, and the mixture resulting therefrom is further reacted to effect polymerization of the hydrophilic monomer, thereby preparing a hydrophilic block. The polymerization of at least the hydrophilic monomer is conducted in an amidic solvent in which the hydrophobic block and the at least one hydrophilic monomer are sufficiently soluble to permit polymerization.

Stable free radical agents are known. Suitable stable free radical agents include phenoxy radicals and nitroxy radicals. Examples of phenoxy radicals include phenoxy radicals substituted in the 2 and 6 positions by bulky groups such as tert-alkyl (e.g., t-butyl), phenyl, or dimethylbenzyl, and optionally substituted at the 4 position by an alkyl, alkoxyl, aryl, or aryloxy group or by a heteroatom containing group (e.g., S, N, or O) such as a dimethylamino or diphenylamino group, and materials which contain two or more such aromatic rings bridged at, e.g., the 4 position. The phenoxy radical analogs of such phenoxy radicals are also contemplated. Typical stable nitroxy radicals are those having the general formula $R_1R_2N—O•$, where $R_1$ and $R_2$ are tertiary alkyl groups, or where $R_1$ and $R_2$ together with the N atom form a cyclic structure, preferably having tertiary branching at the positions alpha to the N atom. Examples of hindered nitroxy radicals include 2,2,5,5-tetraalkylpyrrolidinoxyl radicals, as well as those in which the 5-membered heterocycle ring is fused to an alicyclic or aromatic ring, hindered aliphatic dialkylaminoxyl and iminoxyl radicals such as $(R_3C)_2N—O•$ and $R_2C=N—O•$, diarylaminoxyl and arylalkylaminoxyl radicals such as the nitroxyl radical from alkyl diphenylamine, $(R—Ar)_2N—O•$, nitroxyl derivatives of dihydroquinoline light stabilizers and antiozonanits (available from Ciba-Geigy), in monomeric and polymeric forms, and nitroxyl radicals derived from dibenzo-heterocycles such as phenothiazines and phenoxazines. A specific, preferred example is 2,2,6,6-tetramethyl-1-piperidinyloxy, which is available from Aldrich Chemical Company under the trade name TEMPO™. This material is understood to be a representative of materials of the general structure

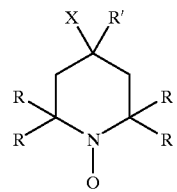

where each R is independently alkyl or aryl, R' is hydrogen, alkyl, or aryl, X is hydrogen, alkyl, aryl, alkoxyl, carbalkoxy, carboxyalkyl, or chloro, or where R' is absent and X is $=O$ or $=S$.

Hindered amine stabilizers are described in detail in *Polymer Stabilization and Degradation*, P. P. Klemchuk, Editor, American Chemical Society, Symposium Series 280, 1985, pages 55–97. These materials are closely related structurally to nitroxy radicals and can be converted thereinto by known means. Accordingly, the hindered amine structures illustrated in particular on pages 56, 58, 61, 91, 92, 94, 95, 97, and 97 of the above-cited document can be taken as illustrative of characteristic structures of a variety of stable nitroxy radicals.

The amount of stable free radical initiator employed in the polymerization of the hydrophobic block is typically 0.001 to 0.01 moles per mole of the hydrophobic monomer, particularly for polymer molecular weights in the range of 10,000 to 100,000. Specific amounts can readily be determined and appropriately adjusted by the person skilled in the art.

The medium for polymerization of the hydrophobic block is not particularly critical and can be any such medium in which polymerization can be effected. Alternatively, polymerization can be conducted in the substantial absence of medium or solvent, that is, neat. Preferably the medium will be an amidic medium, as described below in greater detail in connection with the polymerization of the hydrophilic block, since such a medium could be conveniently used for polymerization of both of the blocks of the polymer. Alternatively, another medium can be used, preferably one in which the reactants are soluble. Examples include alkyl aromatics, preferably in relatively small amounts so that a relatively high concentration of monomer can be maintained. Solvents which readily transfer hydrogen atoms under radical conditions are preferably avoided. If such an alternative medium is used, it should also be one from which the initially formed hydrophobic block can be separated, such as by filtration, precipitation into a nonsolvent, or evaporation of the medium. Thus, the polymerized hydrophobic block can be isolated prior to the further reaction to prepare the hydrophilic block, while retaining the active polymerization site thereon. (This retention of the active polymerization site is a characteristic and a benefit of the use of the stable free radical initiator.) For best results in retaining the active polymerization site, processing of the polymer in the presence of hydrogen atom transfer agents, particularly at elevated temperatures, should be avoided. The isolation of the active polymer can include removal or a portion or all of the reaction medium, and eventually replacing it with the amidic medium described below. Of course, if an amidic medium is used for the polymerization of the first block, isolation will not normally be required.

The polymerization of the hydrophilic block can be accomplished either with or without employing additional free radical initiator. This second phase of the polymerization is accomplished in an amidic solvent in which the hydrophobic block and the at least one hydrophilic monomer are sufficiently soluble to permit the polymerization to proceed.

One useful measure of solubility is the Hildebrand solubility parameter. This parameter is described in detail in *Polymer Handbook*, third edition, ed. J. Brandrup and E. J. Immergut, John Wiley & Sons, New York, 1989, in the chapter "Solubility Parameter Values," E. A. Grulke, pages VII/519 et seq. A list of Hildebrand solubility parameters for certain polymers is found on page VII/544 et seq. of the same reference. Briefly, the solubility parameter $\delta_i$ is defined for solvents as $$\delta_i = (\Delta E^v_i / V_i)^{1/2}$$

where $\Delta E^v_i$ is the energy of vaporization of species i and $V_i$ is the molar volume of species i. While the parameter is most clearly defined for nonpolar solvents, it has been extended to polar solvents and polymeric materials by indirect procedures, as described in the *Polymer Handbook*, page VII/522. A listing of Hildebrand solubility parameters of many commercial polymers is found in Table 3.4, page VII/544, of that reference. The Hildebrand solubility parameter of materials not listed can be estimated by comparison with polymers which are listed or by the experimental methods outlined in that reference, e.g., by solvency testing (screening) or by measuring swelling values of crosslinked samples. Further information about and values for solubility parameters can be found in the *Handbook of Solubility Parameters and Other Cohesion Parameters*, CRC Press, Inc., Boca Raton, A. Barton, 1983. Further experimental details on the estimation of polymer solubility can be found in ASTM D-3132-84. It has been found that many of the amidic solvents useful in the present invention have a Hildebrand solubility parameter of 20–26 MPa, preferably 22–24 MPa. Methyl formamide, having a solubility parameter of 32.0, is of lesser utility.

Preferred examples of suitable amidic solvents include formamide, acetamide, propionamide, butyramide, pyrrolidone, caprolactam, piperidinone, piperazinedione, acrylamide, methacrylamide, and their N-substituted derivatives, including N,N-disubstituted derivatives, as well as N-alkyl-substituted ureas, or mixtures thereof. Preferred examples include N-alkylacetamides such as N,N-dimethylacetamide and N,N-diethylacetamide.

Since the hydrophilic monomer can itself be an amide, the distinction between the amidic solvent and the amide monomer is not always easy to define. This, however, can represent a desirable feature of the present invention. Thus, for instance, if the bulk of the amidic solvent comprises N,N-dimethylacetamide, a suitable amount of a monomer such as N,N-dimethylacrylamide can be dissolved therein, as well as any other hydrophilic monomers which may be desired. The solubility of an amidic monomer in an amidic solvent will normally be very good, enabling the polymerization reaction to proceed smoothly. Likewise, it is possible that a reactive amidic monomer can itself be employed as the amidic solvent, without any additional solvent, thereby serving as both the solvent and the hydrophilic monomer. Examples of such materials include N,N-dimethylacrylamide, N,N-diethylacrylamide, and the corresponding methacrylamides.

To further facilitate the polymerization of the hydrophilic block, the polymerization can be conducted in the presence of an acid or an amine salt of an acid (other than the hydrophilic monomer itself), in an amount suitable to enhance the rate of polymerization, that is to say, a catalytic amount. Such an acid will normally have a $pK_a$ as measured in water of less than 4, preferably less than 2.5, and more preferably less than 2. A preferred amount of the acid or amine salt is an amount sufficient to reduce the pH of the reaction medium to 4 to 5. Otherwise stated, the ratio of the organic acid to the amount of the sterically hindered free radical initiator is preferably 1:1 to 1:11 by weight. Either organic or inorganic acids can be used; preferred acids include carboxylic acids, sulfonic acids, phosphonic acids, and phosphoric acids. One such acid which has been successfully employed in the past is camphorsulfonic acid. See, for instance, U.S. Pat. No. 5,401,804. Other feasible acids include methane sulfonic acid, 2-fluoro-1-methylpyridinium p-toluenesulfonate, and pyridinium p-toluenesulfonate.

The temperature to polymerize each block is not particularly critical, but is normally within the range of 60 to 180° C. The preferred polymerization temperature of the hydrophobic block is 110–140° C, more preferably 120–130° C. The preferred polymerization temperature of the hydrophilic block is similar, e.g., preferably 120 to 150° C.

Depending on the conditions of the reaction, the product obtained may contain certain amounts of the polymers of the individual blocks, that is, some of the homopolymer of the hydrophobic block and some of the homopolymer of the hydrophilic block (or the corresponding copolymers, if more than one hydrophobic or hydrophilic monomer are employed). Non-block polymer of the hydrophobic monomer can result from deactivation of the active radical sites before the second step of polymerization is begun; non-block polymer of the hydrophilic monomer can result from initiation of polymerization of this monomer by entities other than active sites on the hydrophobic block. Such blends of polymers are included within the scope of the present invention.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character.

Examples of hydrocarbyl groups include:

(1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical);

(2) substituted hydrocarbon substituents, that is, substituents containing non-hydrocarbon groups which, in the context of this invention, do not alter the predominantly hydrocarbon substituent (e.g., halo (especially chloro and fluoro), hydroxy, alkoxy, mercapto, alkylmercapto, nitro, nitroso, and sulfoxy);

(3) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

Similarly, the term "hydrocarbylene" refers to a divalent hydrocarbyl group, akin to the term "alkylene."

It is known that some of the materials described above may interact in the final formulation, so that the components of the final formulation may be different from those that are initially added. For instance, metal ions (of, e.g., a detergent) can migrate to other acidic sites of other molecules. The products formed thereby, including the products formed upon employing the composition of the present invention in its intended use, may not susceptible of easy description. Nevertheless, all such modifications and reaction products are included within the scope of the present invention; the present invention encompasses the composition prepared by admixing the components described above.

EXAMPLES

Example 1
Preparation of First Block

To a 1 L, 4-necked flask is charged 600 g styrene, 3.69 g TEMPO™ radical initiator, 4.84 g benzoxyl peroxide, and 1.08 g camphorsulfonic acid. The mixture is stirred mechanically under nitrogen at 125° C. for 6 hours, at which time the mixture is allowed to cool overnight. The mixture is again heated to 125° C. for an additional 3 hours. After cooling to 70° C., the mixture is dilute with 300 mL toluene and is transferred to a larger flask. The diluted mixture is further diluted with an additional 300 mL toluene and the product polymer is precipitated by addition of 5 L methanol and isolated.

Example 2
Preparation of Second Block

To a 50 ml. round bottomed flask is charged 1.0 g sodium salt of 2-acrylamido-2-methylpropanesulfonic acid (purified dry powder) and 6 mL dimethylacetamide. The mixture is stirred to promote solution. To the mixture is added 1.0 g of the active polymer from Example 1, and the mixture stirred at 85° C. for about 15 minutes, to produce a milky suspension. The temperature is increased to 130° C. and stirring maintained for 6 hours.

The mixture is cooled, 25 mL of methanol is added, and the resulting white powder is isolated by filtration. The powder is redissolved in toluene and precipitated with methanol, isolated, redissolved in tetrahydrofuran, and reprecipitated with water to yield 0.8 g polymer.

Example 3

A 50 mL round bottom flask is charged with 1.0 g sodium salt of 2-acrylamido-2-methylpropanesulfonic acid, 1.0 g dimethylacrylamide, and 5.0 g dimethylacetamide, and stirred to promote solution. The mixture is heated to 50° C. and 1.0 g of the active polymer from Example 1 is added. The temperature is increased to 130° C., with stirring, and maintained at temperature for 7 hours.

The mixture is cooled and acetone is added to precipitate the resulting polymer. The polymer is collected by filtration and washed by stirring with first methanol, then water, and then methanol. 1.7 g of polymer is isolated.

Example 4
Preparation of First Block

A 100 mL resin bottle is charged with 50 g styrene, 1.22 g TEMPO™ free radical initiator, 1.64 g benzoyl peroxide, and 0.50 g camphorsulfonic acid. The mixture is stirred under nitrogen at 130° C. for 8 hours. After allowing to cool, the mixture is again heated to 130° C. for an additional 6 hours, at which time it is cooled to 100° C. and diluted with 100 mL toluene and the product polymer precipitated into 1 L of methanol. The precipitated polymer is collected by filtration and dried under vacuum.

Example 5
Preparation of Second Block

To a 50 ml, round bottomed flask is charged 3.0 g sodium salt of 2-acrylamido-2-methylpropanesulfonic acid, 3.0 g dimethylacrylamide, and 3.0 g dimethylacetamide. The mixture is stirred at room temperature under nitrogen. To the mixture is added 1.0 g of the active polymer from Example 4. The mixture coagulates and heating is begun. When the mixture is heated to 100° C. the mixture becomes cloudy but relatively homogeneous. Stirring is maintained at 130° C. for 7 hours. The mixture is cooled, diluted with about 5 mL methanol and precipitated into ether. 4.0 g polymer is isolated.

Example 6

To a 50 mL round bottomed flask is charged 1.0 g of the active polymer from Example 4, 1.0 g of the sodium salt of styrene sulfonate, and 6.0 g dimetlhylacetamide. The non-homogeneous mixture is heated, with stirring, to 130° C. under nitrogen. The mixture is maintained at 130° C. for 7 hour. The mixture is cooled, and the polymer is precipitated by addition of methanol and isolated by filtration. After heating the product with toluene and addition of methanol, the mixture is filtered to obtain 1.1 g polymer.

Example 7
Preparation of Polymer (A) To a 500 mL round bottomed four-necked flask, equipped with nitrogen inlet, thermocouple, condenser, and overhead stirrer, is charged 200 g styrene, 2.34 g TEMPO™ stable nitroxyl, 3.03 g benzoyl peroxide, and 0.70 g camphorsulfonic acid. The mixture is heated, with stirring, to 125° C. After stirring for 6 hours, the mixture is allowed to cool to room temperature overnight. The heating is continued for an additional 7 hours, at which time the mixture is cooled, diluted with 250 mL toluene, and precipitated into 2.5 L methanol.

(B) To a 100 mL resin kettle is charged 15 g of the sodium salt of 2-acrylamido-2-methylpropanesulfonic acid, 15 g dimethylacrylamide, 15 g dimethylacetamide. The mixture is heated to 50° C. under nitrogen, to effect dissolution. To the mixture is added 5.0 g of the polymer prepared above. The mixture is heated to 140° C. and maintained at temperature for 7 hours. The resulting clear, yellow, viscous mixture is brought to 70° C. and diluted with 50 mL of water. To the diluted mixture is added, over 30 minutes, 5 mL water in which is dissolved 0.2 g Vaso 50™ initiator. The mixture is heated for an additional 2 hours to complete the polymerization.

Example 8
Preparation of Second Block

To a 50 mL round bottomed flask is charged 1.0 g of the active polymer of Example 4, 1.0 g of the sodium salt of styrene sulfonate, and 6.0 g dimethylacetamide. The non-homogeneous mixture is heated with stirring to 130° C. under nitrogen. Stirring is continued at 130° C. for 7 hours. The mixture is cooled, and methanol is added to precipitate the polymer, which is isolated by filtration. After heating the product with toluene and addition of methanol, the mixture is filtered to obtain 1.1 g polymer.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. It is to be understood that the upper and lower amount, range, and ratio limits set forth herein may be independently combined. As used herein, the expression "consisting essentially of" permits the inclusion of substances which do not materially affect the basic and novel characteristics of the composition under consideration.

The block copolymers prepared by the process of this invention are useful as surfactants for emulsion polymerizations, for stabilization of latex particles, as carriers for emulsions of non-polar agents, as adjuvants in agricultural sprays, herbicides, and pesticides, in slow release fertilizers, in soil remediation agents, and in cleansers. They are also useful as additives for polymers, to improve dye reception, in water-transport membranes, and as agents to modify surface properties of fibers and films. They are also useful as associative polymers for use in aqueous systems such as hydraulic and metalworking fluids, as extreme-pressure/anti-wear agents and antimisting aids.

What is claimed is:

1. A process for preparing a block copolymer comprising a hydrophobic block (A) comprising one or more hydrophobic monomers and a hydrophilic block (B) comprising one or more hydrophilic monomers, said process comprising:
   (a) first polymerizing at least one hydrophobic monomer comprising at least one vinyl aromatic monomer to prepare a hydrophobic block as an end block, using a free radical polymerization process,
      wherein a stable free radical agent is employed during the polymerization, thereby preserving a stabilized active polymerization site on the hydrophobic block;
   (b) thereafter adding at least one hydrophilic monomer to the stabilized active hydrophobic block of (a); and
   (c) further reacting the mixture of (b) to effect polymerization of said hydrophilic monomer, thereby preparing a hydrophilic block;
      wherein the polymerization of the hydrophilic monomer is conducted in an amidic solvent in which the hydrophobic block and the at least one hydrophilic monomer are sufficiently soluble to permit polymerization;
      wherein the at least one hydrophilic monomer comprises a mixture of 2-acrylamido-2-methylpropanesulfonic acid or a salt thereof and N,N-dimethylacrylamide.

2. A process for preparing a block copolymer comprising a hydrophobic block (A) comprising one or more hydrophobic monomers and a hydrophilic block (B) comprising one or more hydrophilic monomers, said process comprising:
   (a) first polymerizing at least one hydrophobic monomer comprising at least one vinyl aromatic monomer to prepare a hydrophobic block as an end block, using a free radical polymerization process,
      wherein a stable free radical agent is employed during the polymerization, thereby preserving a stabilized active polymerization site on the hydrophobic block;
   (b) thereafter adding at least one hydrophilic monomer to the stabilized active hydrophobic block of (a); and
   (c) further reacting the mixture of (b) to effect polymerization of said hydrophilic monomer, thereby preparing a hydrophilic block;
      wherein the polymerization of the hydrophilic monomer is conducted in an amidic solvent in which the hydrophobic block and the at least one hydrophilic monomer are sufficiently soluble to permit polymerization;
      wherein the hydrophobic monomer of (a) comprises styrene or substituted styrene; the monomers of (b) comprise a mixture of 2-acrylamido-2-methylpropanesulfonic acid or a salt thereof, and N,N-dimethylacrylamide; and wherein the amidic solvent comprises N,N-dimethylacrylamide or N,N-diethylacrylamide.

3. A process for preparing a block copolymer comprising a hydrophobic block (A) comprising one or more hydrophobic monomers and a hydrophilic block (B) comprising one or more hydrophilic monomers, said process comprising:
   (a) first polymerizing at least one hydrophobic monomer comprising at least one vinyl aromatic monomer to prepare a hydrophobic block as an end block, using a free radical polymerization process,
      wherein a stable free radical agent is employed during the polymerization, thereby preserving a stabilized active polymerization site on the hydrophobic block;
   (b) thereafter adding at least one hydrophilic monomer to the stabilized active hydrophobic block of (a); and
   (c) further reacting the mixture of (b) to effect polymerization of said hydrophilic monomer, thereby preparing a hydrophilic block;
      wherein the polymerization of the hydrophilic monomer is conducted in an amidic solvent in which the hydrophobic block and the at least one hydrophilic monomer are sufficiently soluble to permit polymerization;
   wherein said hydrophilic monomer comprises 2-acrylamido-2-methylpropane-sulfonic acid or a salt thereof.

4. The process of claim 3 wherein the polymerization of the hydrophobic block (A) is conducted in an amidic solvent and wherein the same amidic solvent is employed for the polymerization of the hydrophilic block (B).

5. The process of claim 3 wherein the hydrophobic monomer is styrene or a substituted styrene.

6. The process of claim 3 wherein the amidic solvent has a Hildebrand solubility parameter of about 20–26 MPa.

7. The process of claim 3 wherein the amidic solvent is formamide, acetamide, propionamide, butyramide, pyrrolidone, caprolactam, piperidinone, piperazinedione, acrylamide, methacrylamide, or their N-substituted derivatives, or an N-substituted urea, or mixtures thereof.

8. The process of claim 3 wherein the amidic solvent comprises N,N-dimethylacetamide or N,N-diethylacetamide.

9. The process of claim 3 wherein the amidic solvent comprises N,N-dimethylacetamide in which is dissolved N,N-dimcthylacrylamide as a hydrophilic monomer.

10. The process of claim 3 wherein the amidic solvent comprises an amidic monomer which functions also as a hydrophilic monomer.

11. The process of claim 3 wherein the polymerization of the hydrophobic block (A) is conducted in the substantial absence of solvent.

12. The process of claim 3 wherein the polymerization of the hydrophobic block (A) is conducted in a solvent other than amidic solvent.

13. The process of claim 3 wherein the stable free radical agent is a phenoxy radical or a nitroxy radical.

14. The process of claim 13 wherein the stable free radical agent is a nitroxy radical of the general formula $R_1R_2N\text{—}O\bullet$, where $R_1$ and $R_2$ are tertiary alkyl groups, or where $R_1$ and $R_2$ together with the N atom form a cyclic structure having tertiary branching at the positions alpha to the N atom.

15. The process of claim 14 wherein the nitroxy radical is 2,2,6,6-tetramethyl-1-piperidinyloxy.

16. The process of claim 3 wherein the polymerization of the hydrophobic block of the polymer is conducted at a temperature of about 60 to about 180° C.

17. The process of claim 3 wherein the polymerization of the hydrophilic block of the polymer is conducted at a temperature of about 60 to about 180° C.

18. The process of claim 3 wherein the polymerized hydrophobic block is isolated prior to the reaction to prepare the hydrophilic block, while retaining the active polymerization site thereon.

19. The process of claim 3 wherein the reaction to prepare the hydrophobic block is conducted without isolation of the polymerized hydrophobic block.

20. The process of claim 3 wherein the polymerization of the hydrophilic block of the polymer is conducted without further addition of free radical initiator to the reaction mixture.

21. The process of claim 3 wherein the polymerization of the hydrophilic block of the polymer is completed by further addition of free radical initiator.

22. The process of claim 3 wherein the polymerization is conducted in the presence of an acid or an amine salt thereof, other than the hydrophilic monomer, in an amount suitable to enhance the rate of polymerization.

23. The process of claim 22 wherein the acid other than the hydrophilic monomer has a $pK_a$ of less than about 4 in water.

24. The process of claim 3 wherein the polymerization is continued to provide a block copolymer having a weight average molecular weight of about 15,000 to about 200,000.

25. The process of claim 3 wherein the ratio of the weight of monomers charged to prepare the hydrophobic block to the weight of monomers charged to prepare the hydrophilic block is about 10:1 to about 1:20.

26. The process of claim 25 wherein the weight ratio is about 3:1 to about 1:10.

* * * * *